United States Patent [19]

Yajima et al.

[11] 4,242,487
[45] Dec. 30, 1980

[54] PROCESS FOR PRODUCING HEAT-RESISTANT SEMI-INORGANIC COMPOUNDS

[75] Inventors: Seishi Yajima; Kiyohito Okamura; Toetsu Shishido; Yoshio Hasegawa, all of Oharai, Japan

[73] Assignee: The Foundation: The Research Institute for Special Inorganic Materials, Asahi, Japan

[21] Appl. No.: 34,885

[22] Filed: May 1, 1979

[30] Foreign Application Priority Data

May 9, 1978 [JP] Japan .................................. 53-54036

[51] Int. Cl.$^2$ ............................................. C08G 77/04
[52] U.S. Cl. ..................................... 528/25; 525/474; 528/26; 528/5; 528/29; 528/30
[58] Field of Search ....................... 528/30, 29, 26, 25, 528/11, 4, 5; 525/474

[56] References Cited

U.S. PATENT DOCUMENTS

| 2,517,945 | 8/1950 | Upson | 528/30 |
| 4,152,509 | 5/1979 | Yajima et al. | 528/4 |

Primary Examiner—Melvyn I. Marquis
Attorney, Agent, or Firm—Ladas & Parry

[57] ABSTRACT

A heat-resistant semi-inorganic compound useful as a material for various heat-resistant materials is produced by reacting an organoborosiloxane compound with at least one of aliphatic polyhydric alcohols, aromatic alcohols, phenols and aromatic carboxylic acids at 250° to 450° C. in an inert atmosphere.

3 Claims, 2 Drawing Figures

PROCESS FOR PRODUCING HEAT-RESISTANT SEMI-INORGANIC COMPOUNDS

BACKGROUND OF THE INVENTION

This invention relates to a novel process for producing heat-resistant semi-inorganic compounds.

Known methods for producing organoborosiloxane compounds, a kind of the semi-inorganic compounds, include, for example, the dehydrocondensation reaction of boric acid with a silanediol, the dehydrochlorinating condensation reaction of boric acid with diorganodichlorosilane, the dealcoholizing condensation reaction of boric acid with a diorganodialkoxysilane, and the de-esterifying condensation reaction of a boric ester with a diorganodialkoxysilane. U.S. Pat. No. 2,517,945 discloses a method for producing an organoborosiloxane compound, a linear polymer, which comprises reacting a difunctional boronic acid such as benzeneboronic acid used instead of boric acid which is trifunctional, with diphenylsilanediol at a temperature of 170° to 260° C.

Previously, the present inventors found that an organoborosiloxane polymer having at least one phenyl group bonded to a silicon atom had much better heat resistance than those organoborosiloxane compounds which had been known up to that time, and disclosed the phenyl-containing organoborosiloxane polymer and a method for its production in U.S. Pat. application Ser. No. 835,373 filed Sept. 21, 1977, now Pat. No. 4,152,509. The heat resistance of the phenyl-containing organoborosiloxane polymer is believed to be attributed to its three-dimensional network structure. However, it has the defect that when a high degree of network structure is imparted to the polymer to increase its heat resistance, the softening point of the organoborosiloxane polymer increases extremely, and it is difficultly soluble in a solvent, and therefore, its processability is reduced at the time of using it as a raw material for a heat resistant material. Accordingly, the phenyl-group containing organoborosiloxane polymer which the present inventors previously suggested is not entirely satisfactory.

The present inventors made extensive investigations, and found that a semi-inorganic compound having a borosiloxane bond which has superior heat resistance and is readily soluble in solvent can be obtained by reacting an organoborosiloxane compound with at least one specified organic compound selected from the group consisting of aliphatic polyhydric alcohols, aromatic alcohols, phenols and aromatic carboxylic acids. This discovery has led to the present invention. Since the semi-inorganic compound obtained by the novel process is readily soluble in a solvent, it has very good processability and is useful as a raw material for various heat-resistant materials.

SUMMARY OF THE INVENTION

According to this invention, there is provided a process for producing a heat resistant semi-inorganic compound, which comprises reacting an organoborosiloxane compound with at least one organic compound selected from the group consisting of aliphatic polyhydric alcohols, aromatic alcohols, phenols and aromatic carboxylic acids at a temperature of 250° to 450° C. in an atmosphere inert to the reaction.

DETAILED DESCRIPTION OF THE INVENTION

Figure 1:
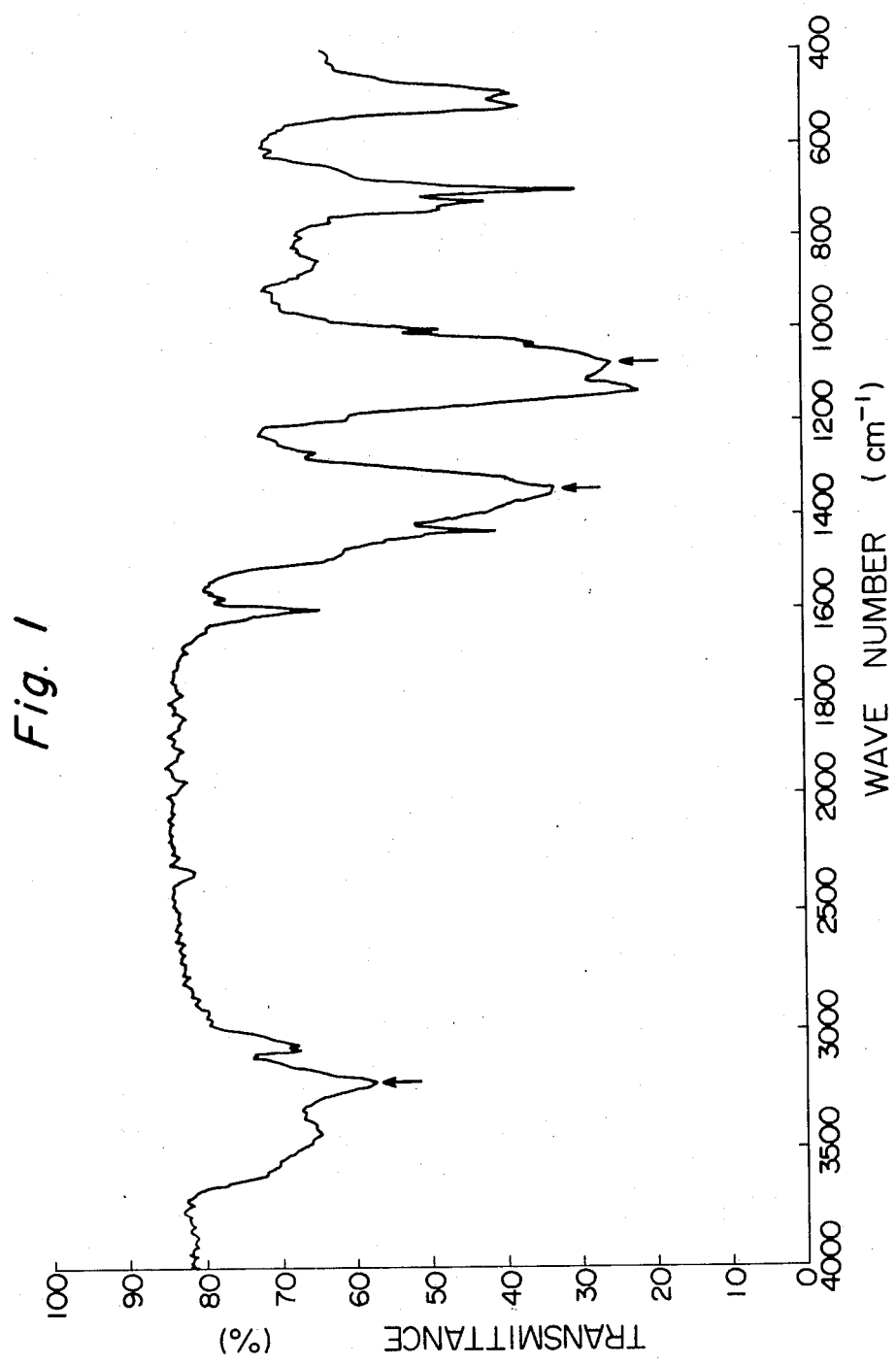
FIG. 1 is an infrared absorption spectral chart of the heat resistant semi-inorganic compound synthesized in Example 3 of this application.

The organoborosiloxane compound used as a starting material in this invention is a semi-inorganic compound (i.e., an organic-inorganic compound) in which a boron atom is bonded to a silicon atom through an oxygen atom, and the organic group is bonded to the silicon atom as a side chain. Such an organoborosiloxane compound is known per se.

The organoborosiloxane compound can be produced, for example, by the dehydrocondensation reaction of boric acid with silanediol, the dehydrochlorinating condensation reaction of boric acid with diorganodichlorosilane, the dealcoholizing condensation reaction of boric acid with a diorganodialkoxysilane, or the de-esterifying condensation reaction of a boric ester with a diorganodialkoxysilane. Furthermore, instead of using the reaction of the aforesaid difunctional silanes with boric acid, a trifunctional silane such as trichlorophenylsilane may be reacted with boric acid to synthesize an organoborosiloxane compound.

R. L. Vale, in J. Chem. Soc., 2252 (1960), reported the production of a borosiloxane compound of the following formula by the dehydrochlorinating condensation reaction of dichlorodimethylsilane with boric acid.

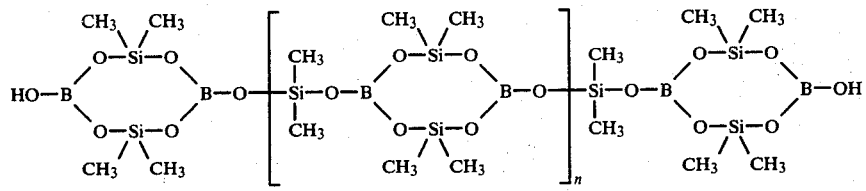

It was reported that the molecular weight of this compound is 500 to 1,000 as a result of elemental analysis, determination of the amount of hydrogen chloride generated, end-group analysis, ebulliometry, and cryoscopy.

In Isvest, Akad, Nauk S.S.S.R. Otdel, Khim. Nauk, 303 (1957), K. A. Andrianov and L. M. Volkova reported the production of a borosiloxane compound by the polycondensation of an alkyl- or aryl-dialkoxysilane with triacetoxyboron, or the polycondensation of an alkyl- or aryl-diacetoxysilane with butyl borate. The reaction product in the latter-mentioned polycondensation is represented, for example, by the following formula.

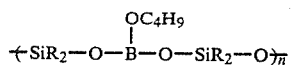

U.S. Patent application Ser. No. 835,373 filed previously by the present inventor and now Pat. No. 4,152,509, discloses a method for synthesizing polyborodiphenylsiloxane by the polycondensation of diphenyldichlorosilane or diphenylsilanediol with boric acid. When in this polycondensation process, the reaction is carried out in benzene or n-butyl ether, a borodiphenylsiloxane compound having a low molecular weight is obtained as an intermediate. Heating the intermediate at 400° C., for example, gives polyborodiphenylsiloxane having a molecular weight of 500 to 10,000 and a high degree of crosslinkage. The molecular weight of the intermediate can be measured by gel permeation chromatography (GPC), ebulliometry, cryoscopy, etc., and has been found to be less than about 1,000. Infrared absorption spectroscopy or elemental analysis shows that the reaction product formed between diphenyldichlorosilane and boric acid contains compounds having the following structures.

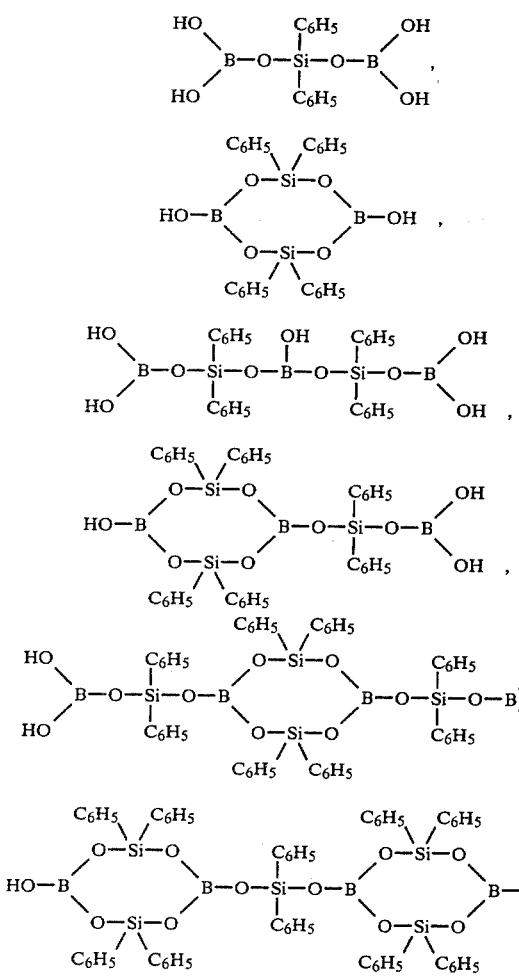

The reaction product formed between diphenylsilanediol and boric acid is considered to contain compounds having the following structures.

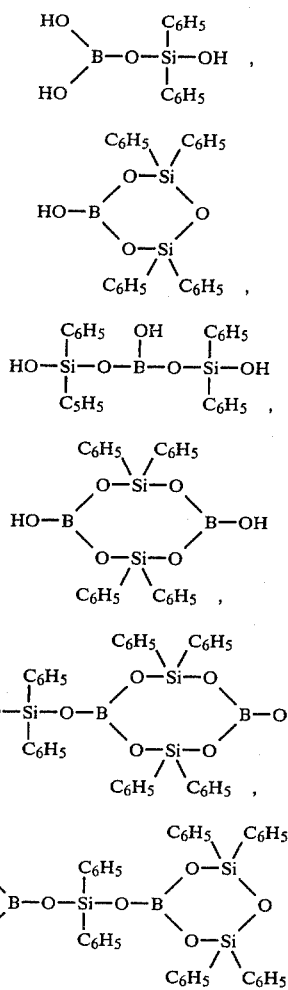

Addition of a small amount of a monofunctional silane such as triphenylchlorosilane or triphenylsilanol in the above reaction can reduce the molecular weight of the resulting organoborosiloxane compound.

The organoborosiloxane used as a starting material in this invention is produced by the condensation reaction of a silane derivative component composed mainly of a difunctional silane derivative and optionally containing a small amount of a monofunctional or trifunctional silane derivative with a boric acid component composed of boric acid or a boric acid derivative. Usually, the reaction product is not a single compound, but is obtained as a mixture of many compounds having a borosiloxane bond. The organoborosiloxane compound used in this invention may be a single compound or a mixture of many organoborosiloxane compounds. The structures and contents of the individual compounds of the mixture are difficult to determine accurately. The average molecular weight of the mixture can be determined by an ordinary method of measuring molecular weights such as ebulliometry or cryoscopy.

The side-chain organic group bonded to the silicon atom of the organoborosiloxane compound used in this invention can be a hydrocarbon group, for example an alkyl group such as methyl or ethyl, a cycloalkyl group such as cyclohexyl, or an aryl group such as phenyl. The phenyl group is especially preferred. An organoborosiloxane compound having a highly developed network structure is undesirable for use in the process of this invention because its reactivity with the aliphatic polyhydric alcohol, aromatic alcohol, phenol or aromatic carboxylic acid is reduced. Preferably, the starting organoborosiloxane compound generally has molecules with a size corresponding to a monomer or to an oligomer at the largest. Such an organoborosiloxane compound having a relatively low average molecular weight can be produced by lowering the reaction temperature or by using a monofunctional organosilane derivative. The organoborosiloxane compound used in this invention has an average molecular weight of generally not more than about 2,000, preferably not more than 1,300.

The organic compound to be reacted with the organoborosiloxane in the process of this invention is at least one compound selected from the group consisting of aliphatic polyhydric alcohols, aromatic alcohols, phenols and aromatic carboxylic acids. The desired heat-resistant semi-inorganic compound containing a borosiloxane bond can be obtained by mixing the organic compound intimately with the organoborosiloxane compound and reacting the mixture at a temperature of from 250° to 450° C. in an atmosphere which is inert to the reaction.

Suitable aliphatic polyhydric alcohols used in the process of this invention are ethylene glycol and glycerol. Benzyl alcohol is suitable as the aromatic alcohol. Generally, with increasing number of carbon atoms on the hydrocarbon chain, the resulting compound tends to decrease in softening point, and to have poor heat resistance.

Examples of the phenols are phenol, pyrocatechol, resorcinol, hydroquinone, orciol, pyrogallol, phloroglucine, hydroxyhydroquinone, cresol, thymol, carvacrol, bisphenol A, naphthol, binaphthol, anthrol, and anthrahydroquinone.

Examples of the aromatic carboxylic acid are benzoic acid, phthalic acid, isophthalic acid and terephthalic acid.

Of these organic compounds, the aromatic alcohols, phenols and aromatic carboxylic acids are generally preferred, and the phenols are especially preferred. Of the phenols, phenol and hydroquinone are preferred.

The amount of the organic compound is generally 0.1 to 3 moles, preferably 0.1 to 1 mole, per mole of the organoborosiloxane compound. If the amount is less than 0.1 mole, the resulting compound does not show a marked increase in heat resistance. If it is more than 3 moles, the unreacted compounds remain, or the heat resistance of the resulting product is reduced.

The reason for limiting the reaction temperature in the process of this invention to 250°–450° C. is that below 250° C., the reaction does not proceed sufficiently, and above 450° C., the decomposition of the borosiloxane bond, or conversion to an inorganic material occurs. The conversion to an inorganic material means the phenomenon whereby the thermal decomposition or liberation of the side-chain organic group or the development of a three-dimensional network structure by crosslinking occurs, and incident to this, the hydrogen content decreases markedly, and consequently, the reaction product is converted to an inorganic material (ceramics) composed mainly of silicon, oxygen, boron and carbon.

In the process of this invention, the reaction can be carried out in the presence of a solvent or diluent. Generally, it is preferable to mix the organopolyborosiloxane and the organic compound intimately without using a solvent or diluent, and react the resulting mixture at the specified temperature in an inert atmosphere.

Preferably, heating of the reactant mixture is started at room temperature, and the mixture is brought to the specified temperature at a suitable rate of temperature elevation. The suitable rate of temperature elevation depends upon the type of the organic compound, and is difficult to determine definitely. It denotes the rate of temperature elevation at which the evaporation of the aliphatic or aromatic alcohol or the sublimation of the phenol or aromatic carboxylic acid does not occur, and thus, the dissipation of the organic compound from the reaction system without being reacted is prevented.

It is essential that in the process of this invention, the reaction of the organic compound with the organoborosiloxane compound be carried out in an atmosphere which is inert to the reaction. The inert atmosphere is preferably an atmosphere of nitrogen gas or a rare gas such as argon. Use of reduced pressures is not desirable since the reacted compounds are removed out of the reaction system. Usually, the reaction is carried out at atmospheric pressure. Use of an oxidizing atmosphere such as air is undesirable because oxidation occurs during the reaction.

The softening point of the heat-resistant semi-inorganic compound can be controlled by suitably selecting the reaction temperature and/or the reaction time in performing the process of this invention. Generally, the softening point increases with higher reaction temperatures and longer periods of reaction time.

It has not yet been fully clear what reactions will occur when the organoborosiloxane compound is reacted with the organic compound (i.e., the aliphatic polyhydric alcohol, aromatic alcohol, phenol or aromatic carboxylic acid) in accordance with the present invention. Presumably, very complex reactions will occur at this time. The reaction of the organic compound with the OH group bonded to a boron or silicon atom, ring-opening reaction (if the organoborosiloxane compound is a cyclic compound), cleavage of the Si-O-B bond, and other reactions will possibly take place, and it is presumed that these reactions compete with one another to induce a very complex reaction as a whole.

The heat-resistant semi-inorganic compound obtained by the process of this invention is described below.

While conventionally known heat-resistant polymers such as wholly aromatic polyamides and Teflon (tetrafluoroethylene fluorocarbons) have limited applications because they are insoluble in solvents or decompose without softening and thus have poor processability, the heat-resistant semi-inorganic compound obtained by the process of this invention dissolves easily in organic solvents such as tetrahydrofuran and softens at high temperatures, and can be easily shaped into various articles. Thermogravimetric analysis shows that the semi-inorganic compound of this invention scarcely reacts with oxygen at a temperature of up to about 450° C. and has high oxidation resistance. Thus, it can be used as a binder for various ceramic powders or metal powders or as a paint, and can be expected as a new heat-resistant material. If desired, the compound in accordance with this invention can have an increased softening temperature, and further can be heat-cured, by heating it to a temperature above its original softening point. Thus, materials having higher heat resistance can be produced by processing the semi-inorganic material of this invention at a relatively low temperature, and heat-treating it.

The following Examples illustrate the present invention in more detail.

EXAMPLE 1

A 5-liter three-necked flask was charged with 310 g of boric acid, 1,898 g of diphenyldichlorosilane and 3 liters of n-butyl ether, and the mixture was reacted with stirring at 100° C. for 18 hours. The reaction mixture was cooled to form a white precipitate. The n-butyl ether was removed, and the precipitate was washed with methanol to remove the unreacted boric acid. The residue was further washed with water to afford 1,680 g of a borodiphenylsiloxane compound having a number average molecular weight of about 400 (a starting material used in the process of this invention).

Ethylene glycol (27 g) was intimately mixed with 200 g of the resulting borodiphenylsiloxane. With stirring, the mixture was heated in a 500 ml flask in an atmosphere of nitrogen at a rate of 120° C. per hour, and the mixture was reacted at 350° C. for 1 hour to afford a deep brown resinous compound.

This compound easily dissolved in tetrahydrofuran and softened at 150° C. When the compound was thermogravimetrically analyzed by heating it in an atmosphere of nitrogen at a rate of 5° C./min., it was found that the temperature at which weight loss began was 225° C., the temperature at which the weight loss reached 5% was 320° C., and the weight residual ratio at 800° C. was 54%.

EXAMPLE 2

Benzyl alcohol (22 g) was intimately mixed with 100 g of the borodiphenylsiloxane compound synthesized in Example 1. The mixture was heated in a 500 ml flask with stirring in an atmosphere of nitrogen at a rate of 100 ° C. per hour, and reached at 400° C. for 1 hour to afford a brown resinous compound.

the compound easily dissolved in tetrahydrofuran, and softened at 180° C. When the compound was thermogravimetrically analyzed, it was found that the temperature at which weight loss began was 260° C., the temperature at which the weight loss reached 5% was 350° C., and the weight residual ratio at 800° C. was 60%.

EXAMPLE 3

Phenol (20 g) was intimately mixed with 200 g of the borodiphenylsiloxane compound synthesized in Example 1. The mixture was heated in a 500 ml flask with stirring in an atmosphere of nitrogen at a rate of 55° C. per hour, and reached at 450° C. for 1 hour to afford a light yellow resinous compound.

The compound easily dissolved in tetrahydrofuran, and softened at 230° C. When the compound was thermogravimetrically analyzed, it was found that the temperature at which weight loss began was 340° C., the temperature at which the weight loss reached 5% was 460° C., and the weight residual ratio at 800° C. was 64.6%. The infrared absorption spectrum of this compound is shown in FIG. 1. This spectrum showed the following absorptions peculiar to the heat-resistant semi-inorganic compound obtained by the process of this invention.

3220 cm$^{-1}$, an absorption attributed to the O-H bond of B-OH or Si-OH; 1350 cm$^{-1}$, an absorption attributed to the O-B bond of Si-O-B; 1080 cm$^{-1}$, an absorption attributed to the Si-O bond of Si-O-B or Si-O-Si.

EXAMPLE 4

Hydroquinone (20 g) was intimately mixed with 200 g of the borodiphenylsiloxane compound synthesized in Example 1. The mixture was heated in a 500 ml flask with stirring in an atmosphere of nitrogen at a rate of 50° C. per hour, and reacted at 300° C. for 1 hour to afford a light yellow resinous compound.

This compound dissolved easily in tetrahydrofuran, and softened at 180° C. As a result of thermogravimetric analysis, it was found that the temperature at which weight loss began was 300° C., the temperature at which the weight loss reached 5% was 440° C., and the weight residual ratio at 800° C. was 65.5%.

Figure 2:
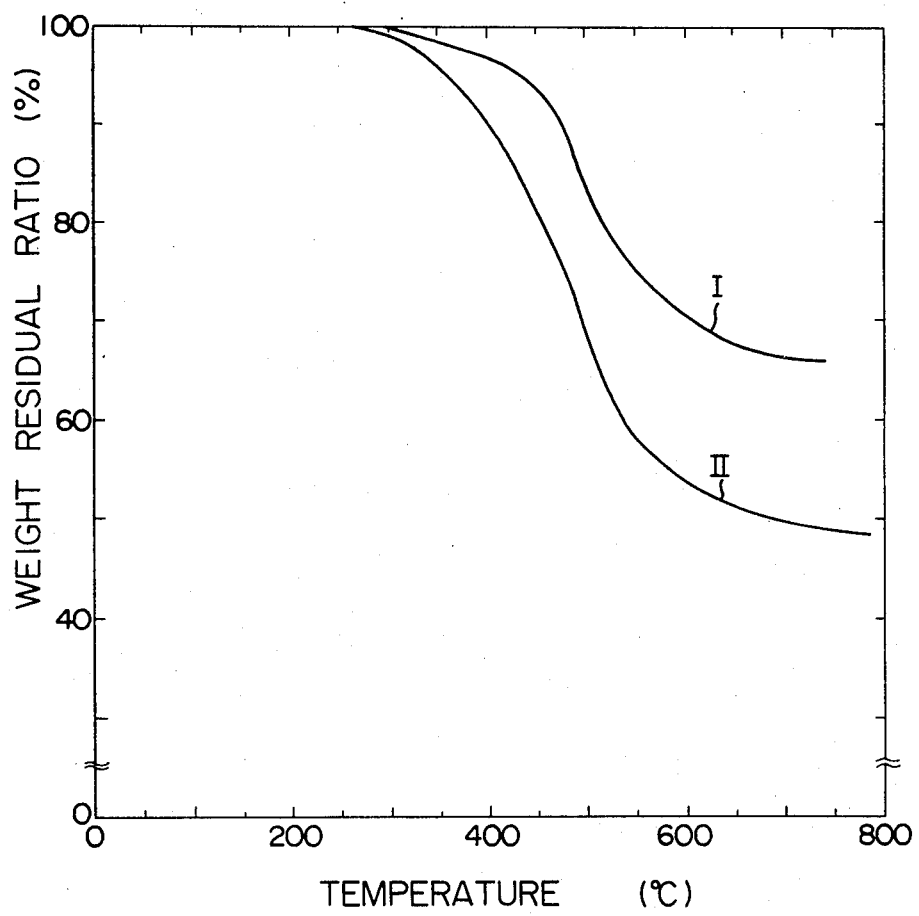
FIG. 2 shows a thermogravimetric curve (curve I) of the heat resistant semi-inorganic compound synthesized in Example 4 of this application, and a thermogravimetric curve (curve II) of conventional polyborodiphenylsiloxane given for comparison.

The two thermogravimetric curves in FIG. 2 (measured in an atmosphere of nitrogen at a temperature elevating rate of 5° C. per hour) explains the fact that the heat resistance of the borodiphenylsiloxane compound increases markedly by reacting it with hydroquinone. Curve I refers to the heat-resistant semi-inorganic compound obtained by this Example. Curve II refers to heat-resistant polyborodiphenylsiloxane (which softens at 130° C.) obtained by heating the borodiphenylsiloxane compound synthesized in Example 1 in a 500 ml flask with stirring in an atmosphere of nitrogen at a rate of 50° C. per hour, and then heating it at 400° C. for 1 hour to polycondense it. The experimental result shown in FIG. 2 clearly shows that much higher heat resistance can be imparted to the borodiphenylsiloxane compound by heating it at 300° C. in the presence of hydroquinone than by heating it at 400° C. in the absence of hydroquinone.

EXAMPLE 5

Terephthalic acid (20 g) was mixed with 200 g of the borodiphenylsiloxane compound synthesized in Example 1. The mixture was heated in a 500 ml flask with stirring in an atmosphere of nitrogen at a rate of 100° C. per hour, and when the temperature reached 350° C., the heating was terminated. Thus, a light yellow resinous compound was obtained.

This compound easily dissolved in tetrahydrofuran, and softened at 260° C. As a result of thermogravimetric analysis, it was found that the temperature at which weight loss began was 280° C., the temperature at which the weight loss reached 5% was 360° C., and the weight residual ratio at 800° C. was 67%.

What we claim is:

1. A process for producing a heat-resistant semi-inorganic compound, which comprises reacting an organoborosiloxane compound with at least one organic compound selected from the group consisting of an aliphatic polyhydric alcohol, an aromatic alcohol, a phenol and an aromatic carboxylic acid at a temperature of 250° to 450° C. in an atmosphere inert to the reaction.

2. The process of claim 1 wherein the amount of the organic compound is 0.1 to 3 moles per mole of organoborosiloxane.

3. The process of claim 1 wherein the reaction is carried out in the absence of a solvent or diluent.

* * * * *